United States Patent
Wang et al.

(10) Patent No.: US 8,513,923 B2
(45) Date of Patent: Aug. 20, 2013

(54) BATTERY CHARGING CIRCUIT WITH TRICKLE CHARGING MODE

(75) Inventors: Han-Che Wang, Taipei Hsien (TW); Xin Zhao, Shenzhen (CN); Hong-Sheng Ouyang, Shenzhen (CN); Xiao-Guang Li, Shenzhen (CN); Shin-Hong Chung, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 975 days.

(21) Appl. No.: 12/166,270

(22) Filed: Jul. 1, 2008

(65) Prior Publication Data

US 2009/0058369 A1    Mar. 5, 2009

(30) Foreign Application Priority Data

Aug. 31, 2007 (CN) .......................... 2007 1 0076753

(51) Int. Cl.
*H02J 7/06* (2006.01)
*H02J 7/00* (2006.01)

(52) U.S. Cl.
USPC .......................................... 320/163; 320/160

(58) Field of Classification Search
USPC ........................ 320/157–159, 160, 162–164
See application file for complete search history.

(56) References Cited

U.S. PATENT DOCUMENTS

| | | | | |
|---|---|---|---|---|
| 5,994,879 A | * | 11/1999 | Hsieh | 320/134 |
| 7,432,685 B2 | * | 10/2008 | Hayashi | 320/128 |
| 7,750,604 B2 | * | 7/2010 | Hartular et al. | 320/139 |

FOREIGN PATENT DOCUMENTS

| | | |
|---|---|---|
| CN | 2381056 Y | 5/2000 |
| CN | 2459808 Y | 11/2001 |
| JP | 06-105477 | 4/1994 |

* cited by examiner

*Primary Examiner* — Richard V Muralidar
(74) *Attorney, Agent, or Firm* — Altis Law Group, Inc.

(57) ABSTRACT

The present invention provides a battery charging control circuit to charge batteries in phases. In a first charging phase the charging circuit charges the batteries with a large current and at a second charging phase the charging circuit charges the batteries with a much smaller current. The charging circuit includes a current detection circuit which detects a charge current and provides a detection voltage proportional to the charge current. The battery charging control circuit also includes an amplifier circuit to amplify the detection voltage and a comparison module compares the amplified detection voltage with a reference voltage. If the amplified detection voltage is lower than the reference voltage, the comparison module outputs a switch signal to a control module. The control module controls a charging module to charge the battery in a trickle mode when receiving the switch signal.

7 Claims, 3 Drawing Sheets

BATTERY CHARGING CIRCUIT WITH TRICKLE CHARGING MODE

BACKGROUND

1. Technical Field

The present invention relates to battery circuits, and particularly relates to a battery charging control circuit.

2. General Background

Generally, battery chargers either use a constant current (CC) mode or a constant voltage (CV) mode to charge a battery. In the CC mode, the battery chargers charge the battery with a constant current, and in the CV mode, the battery chargers charge the battery with a constant voltage. However, in either the CC mode or the CV mode, battery charging is terminated once the battery's voltage reaches a peak value (e.g., 4.2 V), resulting in the battery having not been sufficiently charged.

Nowadays, battery chargers has been improved by charging the battery in two phases. In the first phase the battery chargers charge the battery with a large current and in the second phase, the battery chargers charge the battery with a much smaller current. The second phase follows the first phase to sufficiently charge the batteries. Referring to FIG. 3, a circuit diagram of a conventional battery charging circuit using two phases, the circuit includes a bipolar junction transistor (BJT) circuit G1. A power supply P4 is provided for supplying power to the circuit. An anode and a cathode of the P4 are respectively connected with input ports a and b of the circuit. The input port a is further connected to an emitter and a collector of the BJT circuit G1 is grounded via a bypass resistance $R_B$. A battery B4 is charged when being connected between a collector of the BJT G1 and ground. Collector current of the BJT G1 is used to charge the battery B4. The collector current is generally very large when the battery B4 is empty and declines gradually when the charging continues because that the voltage of the battery B4 rises gradually. The collector current is declined to a very low level when the battery B4 approaches to a sufficient charged state.

However, BJTs are not reliable when they are used by the circuit of FIG. 3 to charge a battery in two phases. For example, BJTs tends to undergo temperature drift. This results in that the circuit of FIG. 1 can't control battery charging very precisely.

Therefore, it is necessary to provide an apparatus and method to overcomes the above-identified deficiencies.

SUMMARY

The present invention provides a battery charging control circuit to precisely control battery charging in phases.

The battery charging control circuit includes: a connection jack, a charging module, a current detection circuit, an amplifier circuit, a comparison module, and a control module.

The connection jack is configured for receiving a power supply. The charging module is configured for charging a battery. The current detection circuit is configured for detecting a charge current to the battery, and providing a detection voltage proportional to the charge current. The amplifier circuit is configured for amplifying the detection voltage and providing an amplified detection voltage. The comparison module is configured for comparing the amplified detection voltage with a reference voltage, and outputting a switch signal when the amplified detection voltage is less than the reference voltage. The control module is configured for controlling the charging module to charge the battery with a trickle current in response to the switch signal.

BRIEF DESCRIPTION OF THE DRAWINGS

The components in the drawings are not necessarily drawn to measuring scale, the emphasis instead being placed upon clearly illustrating the principles of the battery charging circuit. Moreover, in the drawings, like reference numerals designate corresponding parts throughout the several views.

DETAILED DESCRIPTION OF THE EMBODIMENTS

Figure 1:
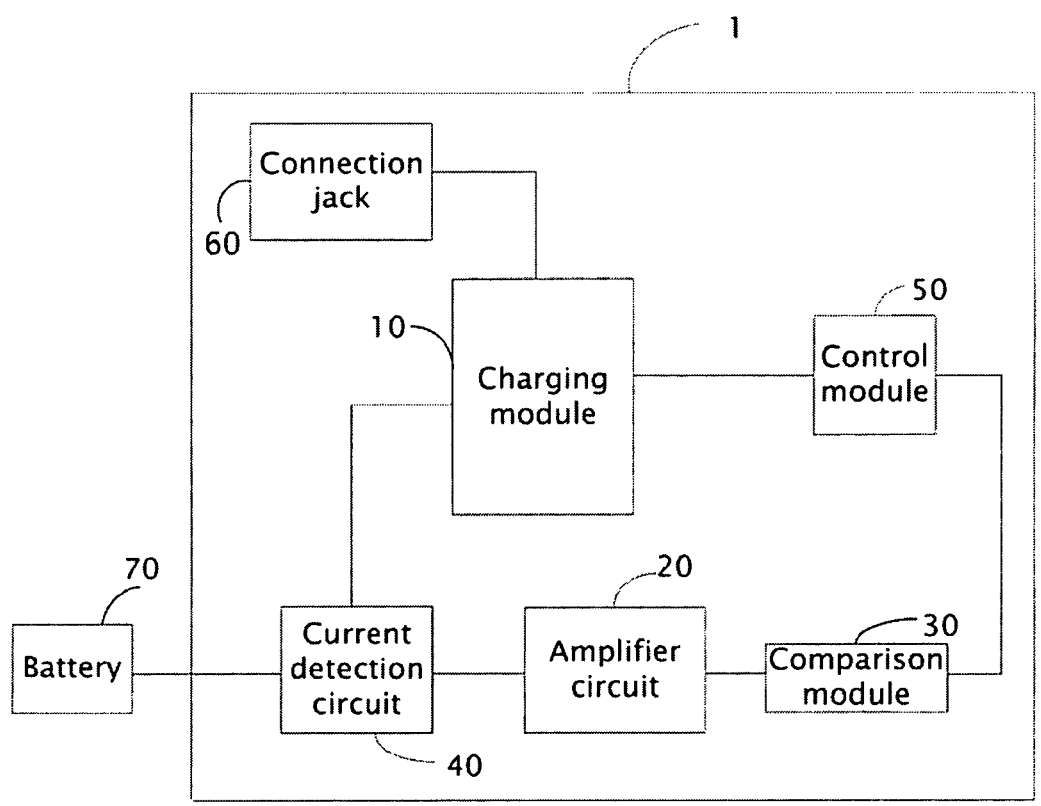
FIG. 1 is a block diagram of a battery charging control circuit according to an exemplary embodiment of the present invention.

FIG. 1 is a block diagram of a battery charging control circuit according to an exemplary embodiment of the present invention. The battery charging control circuit 1 includes a charging module 10, an amplifier circuit 20, a comparison module 30, a current detection circuit 40, a control module 50, and a connection jack 60.

The connection jack 60 is used to connect with a power supply, in the exemplary embodiment, the power supply is an adapter (not shown) which converts an alternating current to a direct current. The charging module 10 is used to receive power form the connection jack 60 and provide a charge current to charge a battery 70. The current detection circuit 40 is used to detect the charge current, and provides a charge voltage (hereinafter, detection voltage) proportional to the charge current. The amplifier circuit 20 is used to amplify the detection voltage. The comparison module 30 is used to compare the amplified detection voltage with a reference voltage, and output a switch signal when the amplified detection current voltage is lower than the reference voltage. The control module 50 is used to control the charging module 10 to provide a small current (i.e., a trickle current) to charge the battery 70 in response to the switch signal, namely to charge the battery in a trickle mode.

When the adapter is plugged into the connection jack 60 and starts charging the battery 70, initially, at a first charging phase, the charge current provided by the charging module 10 is relatively large. The battery 70 is charged with a large charge current during the first charging phase. When the battery is charged during the first charging phase, a voltage of the battery 70 rises gradually, and the charge current declines gradually. The detection voltage is proportional to the charge current and declines too. When the amplified detection voltage is lower than the reference voltage, the comparison module 30 outputs the switch signal. The reference voltage is a predetermined value that indicates a critical point to switch from the first charging phase to a second charging phase. The control module 50 receives the switch signal and controls the charging module 10 to charge the battery 70 with a relatively small current (trickle current).

Figure 2:
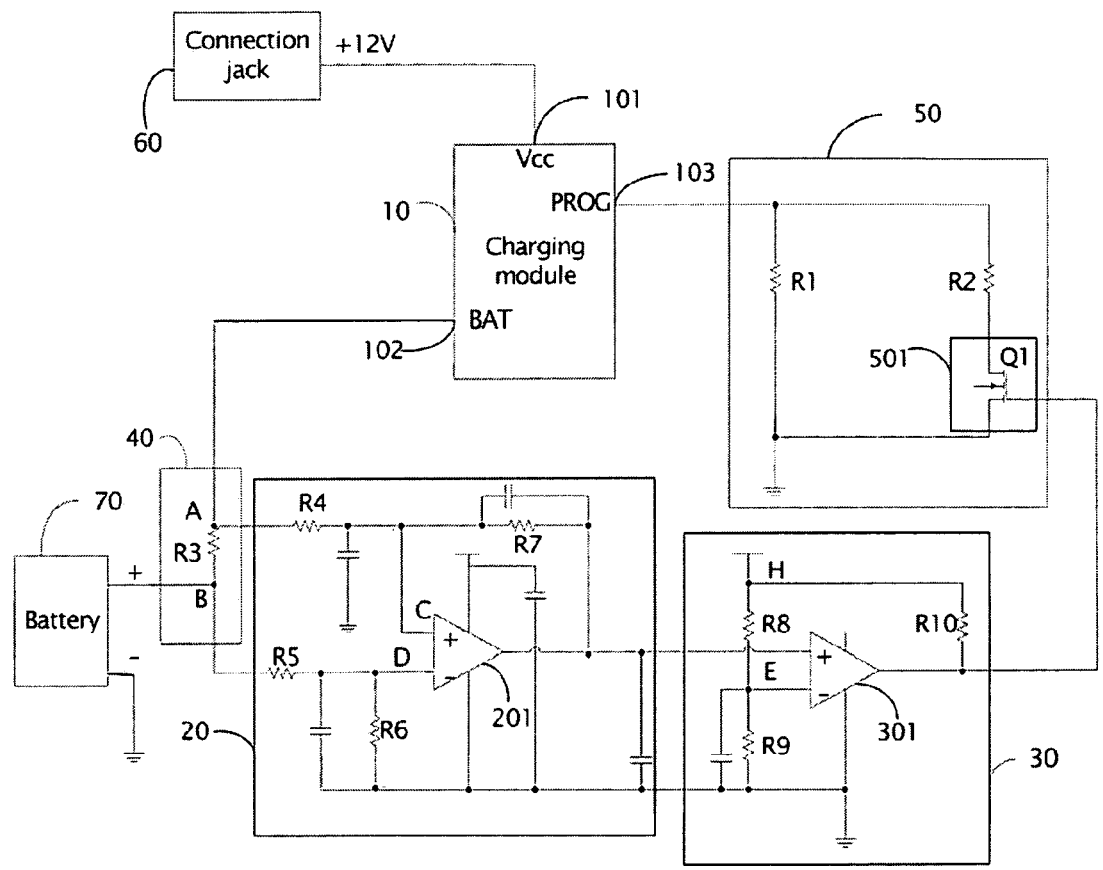
FIG. 2 is a circuit diagram of FIG. 1.
Figure 3:
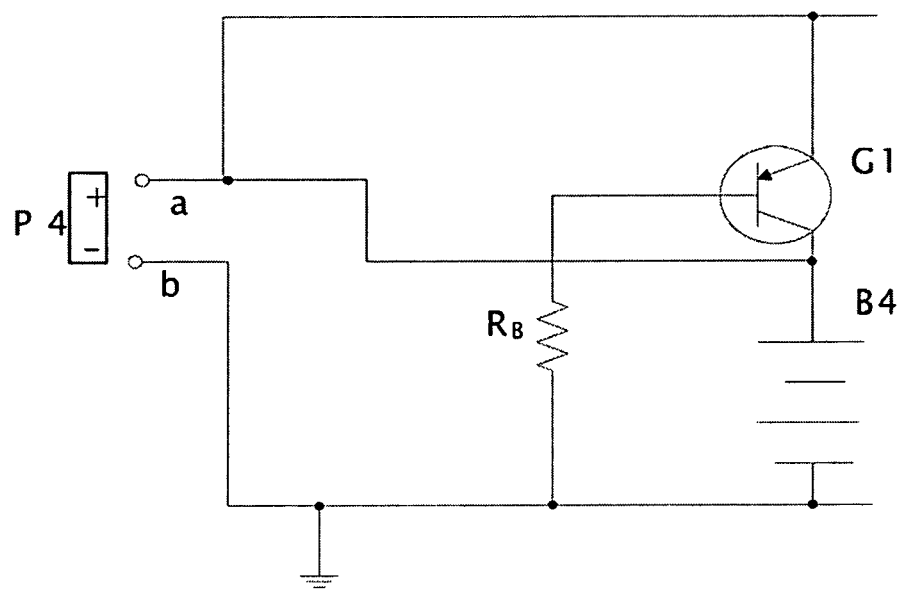
FIG. 3 is a circuit diagram of a battery charging circuit in the related art.

FIG. 2 is a circuit diagram of FIG. 1. The charging module 10 includes a power pin 101 (Vcc), a current output pin 102 (BAT), and a limit current control pin 103 (PROG). The power pin 101 connects with the connection jack 60 to receive power supplied by the adapter. The current output pin 102 outputs the charge current to charge the battery 70. Typically, the charge current is a multiple of a current flowing through the limit current control pin 103.

In the exemplary embodiment of the present invention, the current detection circuit 40 is constituted by a resistor R3 connected between the current output pin 102 and an anode of the battery 70. The detection voltage is equal to a current flowing through the resistor R3 multiplied by a resistance value of the resistor R3. The resistance value of the resistor R3 is very small so as to reduce/minimize power wasted by the resistor R3.

The detection voltage is amplified by the amplifier circuit 20. To more clearly describe the exemplary embodiment of the present invention, a terminal of the current detection circuit 40 connected to the current output pin 102 is symbolically expressed as node A and another terminal of the current detection circuit 40 connected to the anode of the battery 70 is symbolically expressed as node B.

The amplifier circuit 20 includes an operational amplifier 201, a plurality of resistors R4, R5, R6 and R7, and a plurality of capacitors. The operational amplifier 201 includes a non-inverting input port (symbolically expressed as node C), an inverting input port (symbolically expressed as node D) and an output port. The resistors R4 and R7 are serially connected between the node A and the output port of the operational amplifier 201, in addition, a connection point between the resistors R4 and R7 is connected to the non-inverting input port of the operational amplifier 201. The resistors R5 and R6 are serially connected between the node B and ground, furthermore a connection point between the resistors R5 and R6 is connected to the inverting input port D of the operational amplifier 201. In the exemplary embodiment, resistance values of the resistors R4 and R6 are respectively equal to resistance values of the resistors R5 and R7, and the resistance values of the resistors R6 and R7 are n times (a multiple of n) larger than the resistance values of the resistors R4 and R5. Namely $R6=R7=R_I$, $R4=R5=R_X$, and $R_I=nR_X$. To more clearly describe, voltages at node A, node B, and the output port of the operational amplifier 201 are respectively designated as $V_A$, $V_B$, and $V_{OUT}$. $(V_A-V_B)$ is the detection voltage. Vout is obtained according to the following formula:

$$V_{OUT}=(V_A-V_B)*RI/RX=n*(V_A-V_B).$$

In the formula, n represents amplifier gains. The amplifier gains n is 100 in the exemplary embodiment.

In the exemplary embodiment of the present invention, the comparison module 30 includes an analog comparator 301, and resistors R8 and R9. The resistors R8 and R9 are serially connected between a positive potential point H and ground. A connection point of the resistors R8 and R9 is connected to a reference voltage port of the analog comparator 301. In the exemplary embodiment, the reference voltage port of the analog comparator 301 is an inverting input port of the analog comparator 301. The non-inverting input port of the analog comparator 301 is connected to the output port of the operational amplifier 201. The output port of the analog comparator 301 is connected with the positive potential point H via a resistor R10. The output port of the analog comparator 301 is further connected to the control module 50. The positive potential point H provides a reference voltage to the reference voltage port of the analog comparator 301.

The control module 50 includes a first branch and a second branch which are connected in parallel between the limit current pin 103 of the charging module 10 and ground. The first branch includes a resistor R1, and the second branch includes a resistor R2 and a high voltage activated switch 501 that are connected in series. The high voltage activated switch 501 can be an n-channel metal-oxide-semiconductor field-effect transistor (NMOSFFT) or a negative-positive-negative (NPN) BJT. In the exemplary embodiment, an NMOSFFT Q1 is taken as an example to illustrate the high voltage activated switch 501. A source of the NMOSFET Q1 is grounded, a drain of the NMOSFET Q1 is connected to the resistor R2, and a gate of the NMOSFET Q1 is connected to the output port of the analog comparator 301. The resistance value of the resistor R1 is much larger than that of the resistor R2. The limit current control pin 103 provides a constant voltage VPROG. As a result, an amount of current flows through the first branch and the second branch equal to VPROG/R1 and VPROG/R2 respectively. Furthermore, because the resistor R1 has a much higher resistance value than the resistor R2, the current flowing through the first branch is much smaller than the current flowing through the second branch.

In the exemplary embodiment, the output voltage of the adaptor is 12 volt (V). When the adaptor is plugged into the connection jack 60, the battery charging control circuit 1 starts charging the battery at the first charging phase. The gate of the NMOSFET Q1 is connected to the positive potential point H through the resistor R10, resulting in a conduction of the NMOSFET Q1. The first branch is bypassed and a large current VPROG/R2 flows from the limit current control pin 103 to ground through the second branch. The charge current is a multiple of the current from the limit current control pin 103, therefore, the charge current is even larger.

The voltage of the battery 70 rises gradually in the first charging phase. The charge current declines as the voltage of the battery rises and is no more a multiple of the current of the limit current control pin 103. The detection voltage declines gradually because of the decline of the change current. The detection voltage is amplified by the amplifier circuit 20 by 100 times (a multiple of 100) and is transmitted to the analog comparator 301. The analog comparator 301 compares the amplified detection voltage with the reference voltage, and outputs the switch signal when the amplified detection voltage is lower than the reference voltage. The switch signal is a low voltage level signal which turns off the NMOSFET Q1, so that the second branch is cut off. The small current VPROG/R1 flows from the limit current control pin 103 to the ground through the first branch. The charge current thus becomes a multiple of the small current from the limit current control pin 103, therefore the battery charging control circuit 1 charges the battery 70 with the small current, namely charges the battery 70 in the trickle mode.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the present invention.

What is claimed is:

1. A battery charging control circuit, comprising:
    a connection jack configured for receiving a power supply;
    a charging module configured for charging a battery, wherein, the charging module comprises a limit current control pin providing a constant voltage;
    a current detection circuit configured for detecting a charge current to the battery, and providing a detection voltage proportional to the charge current;
    an amplifier circuit configured for amplifying the detection voltage and providing an amplified detection voltage,
    a comparison module configured for comparing the amplified detection voltage with a reference voltage, and outputting a switch signal when the amplified detection voltage is lower than the reference voltage; and
    a control module configured for controlling the charging module to charge the battery with a trickle current in response to the switch signal; wherein, the control module comprises a first branch and a second branch which are connected in parallel between the limit current pin of the charging module and a ground, the first branch includes a resistor having a first resistance value, the second branch includes a resistor and a high voltage activated switch which are connected in series, the resistor of the second branch has a second resistance value smaller than the first resistance value, the high voltage activated switch has a gate connected with the output port of the comparison module.

2. The battery charging control circuit of claim 1, wherein the comparison module comprises an analog comparator and a plurality of resistors, a first and a second resistors connected in series between a high potential point and a ground, a connection point between the first resistor and the second resistor is connected to an inverting port of the analog comparator, a non-inverting port of the analog comparator is connected to the amplifier circuit, and an output port of the analog comparator is connected to the high potential point through a third resistor.

3. The battery charging control circuit of claim 1, wherein the switch signal is a low voltage level signal.

4. The battery charging control circuit of claim 1, wherein the current detection circuit is a resistor.

5. The battery charging control circuit of claim 1, wherein the high voltage activated switch is capable of being turned on and causing the current to flow from the limit current pin to the ground through the second branch, and the high voltage activated switch is also capable of being turned off by the switch signal and causing the current to flow from the limit current pin to the ground through the first branch.

6. The battery charging control circuit of claim 5, wherein the charge current is a multiple of current flowing from the limit current control pin to the ground.

7. The battery charging control circuit of claim 1, wherein the high voltage activated switch is a negative-positive-negative (NPN) BJT or a n-channel metal-oxide-semiconductor field-effect transistor (NMOSFET).

* * * * *